US012519732B1

(12) United States Patent
Lenglet

(10) Patent No.: US 12,519,732 B1
(45) Date of Patent: Jan. 6, 2026

(54) CLASSIFIER FOR NETWORK POLICY-BASED TRAFFIC MANAGEMENT

(71) Applicant: AVIATRIX SYSTEMS, INC., Santa Clara, CA (US)

(72) Inventor: Romain Lenglet, Santa Clara, CA (US)

(73) Assignee: Aviatrix Systems, Inc., Santa Clara, CA (US)

(*) Notice: Subject to any disclaimer, the term of this patent is extended or adjusted under 35 U.S.C. 154(b) by 841 days.

(21) Appl. No.: 17/727,899

(22) Filed: Apr. 25, 2022

Related U.S. Application Data

(60) Provisional application No. 63/182,691, filed on Apr. 30, 2021.

(51) Int. Cl.
*H04L 47/2441* (2022.01)

(52) U.S. Cl.
CPC ............................... *H04L 47/2441* (2013.01)

(58) Field of Classification Search
CPC ......... H04L 47/10; H04L 47/22; H04L 47/24; H04L 47/2408; H04L 47/2425; H04L 47/2433; H04L 47/2441; H04L 47/2475; H04L 47/2483
USPC ........................................................ 370/235
See application file for complete search history.

(56) References Cited

U.S. PATENT DOCUMENTS

| | | | |
|---|---|---|---|
| 7,500,014 B1* | 3/2009 | Jacobson | H04L 43/0811 709/239 |
| 2007/0256128 A1* | 11/2007 | Jung | H04L 63/145 726/24 |
| 2013/0304616 A1* | 11/2013 | Raleigh | H04M 15/745 705/34 |
| 2013/0336229 A1* | 12/2013 | Kakadia | H04W 72/535 370/477 |
| 2016/0134531 A1* | 5/2016 | Assarpour | H04L 45/38 370/392 |
| 2018/0131602 A1* | 5/2018 | Civanlar | H04L 49/3009 |
| 2020/0050576 A1* | 2/2020 | Rangachari | G06F 15/17331 |
| 2020/0120032 A1* | 4/2020 | Bohra | H04L 47/2425 |
| 2020/0274796 A1* | 8/2020 | Garg | H04L 43/10 |
| 2022/0286392 A1* | 9/2022 | Rangel Augusto | H04L 45/74 |

FOREIGN PATENT DOCUMENTS

CA      2825441 A1 * 8/2012 ......... H04L 41/0894

* cited by examiner

*Primary Examiner* — Chi Tang P Cheng
(74) *Attorney, Agent, or Firm* — Jackson Walker LLP

(57) ABSTRACT

A network device, such as an ingress gateway for example, includes data analytic logic and message reconfiguration logic. The data analytic logic is configured to determine which of at least one network policy of a plurality of network policies is applicable to an incoming data flow and assigning a classification identifier in accordance with the at least one network policy. The classification identifier is configured to influence routing paths through at least one cloud network. The message reconfiguration logic is configured to encapsulate the classification identifier into content of the incoming data flow in order to generate a classified data flow for routing from a source to a destination through the at least one cloud network.

22 Claims, 10 Drawing Sheets

CLASSIFIER FOR NETWORK POLICY-BASED TRAFFIC MANAGEMENT

CROSS-REFERENCE TO RELATED APPLICATIONS

This application claims the benefit of priority of U.S. Provisional Patent Application No. 63/182,691, filed Apr. 30, 2021, the entire contents of which are incorporated by reference herein.

FIELD

Embodiments of the disclosure relate to the field of networking. More specifically, one embodiment of the disclosure relates to a cloud network infrastructure that reliably associates applications pertaining to a cloud instance to data flows propagating over the cloud network.

GENERAL BACKGROUND

Over the past few years, cloud computing has provided an Infrastructure as a Service (IaaS), where resources are provided as part of a public cloud network and are made accessible to tenants as a service. One of these services allows tenants to run software components (e.g., virtual machines instances such as virtual servers) residing within the public cloud network. Hence, this migration of software functionality has resulted in an increased usage of virtual private cloud networks (VPCs), namely on-demand, configurable pools of shared resources, which are allocated within a public cloud network and provide a certain level of isolation between the different organizations or other entities (hereinafter, "users") using the resources. However, this increased usage of public cloud network resources has led to greater data traffic and added complexity to cloud network management.

Recently, some software platforms have been developed and deployed with an ability to monitor and manage cloud networking, independent of the selected public cloud provider or providers. For example, one software platform features a controller and a group of gateways, which are deployed as software components of a VPC and are communicatively coupled to each other. For this software platform, the controller and gateways may be configured to support the transmission of a data flow (e.g., a routing of data packets) over a cloud network, where the packets associated with the data flow are routed from a source (e.g., a first application) to a destination (e.g., a second application).

For this conventional network architecture, due to increased cloud complexity, it has become very difficult to discern, with certainty, what applications are related to a data flow propagating over a network in order to determine how the data flow is handled to meet different requirements for that application. Conventionally, each application is assigned an Internet Protocol (IP) address that is included in each packet of the data flow. However, as IP addresses become increasingly ephemeral, their use in identifying an application as the source of a data flow is becoming less and less reliable. Stated differently, due exponential growth of resources identified by an IP address within the cloud network, these IP addresses will need to become more ephemeral, and thus, reliance on IP address for source identification will become less reliable over time.

Moreover, as the amount of data traffic escalates, due to more and more enterprises migrating software components into the cloud network, the operational complexity needed by each gateway to monitor and manage routing of the data traffic has increased commensurably. This operational complexity may stem from the need to more frequently update changes in routing configurations, which is time consuming and disruptive to ongoing communications. The convergence (stabilization) of the network and avoidance of disruption in data communications within the VPCs deployed as part of a public cloud network is necessary as more companies migrate their networking operations to the public cloud network. A technique is needed, and described below, to achieve network convergence through policy-based routing and more accurate association of source applications to their data flows.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
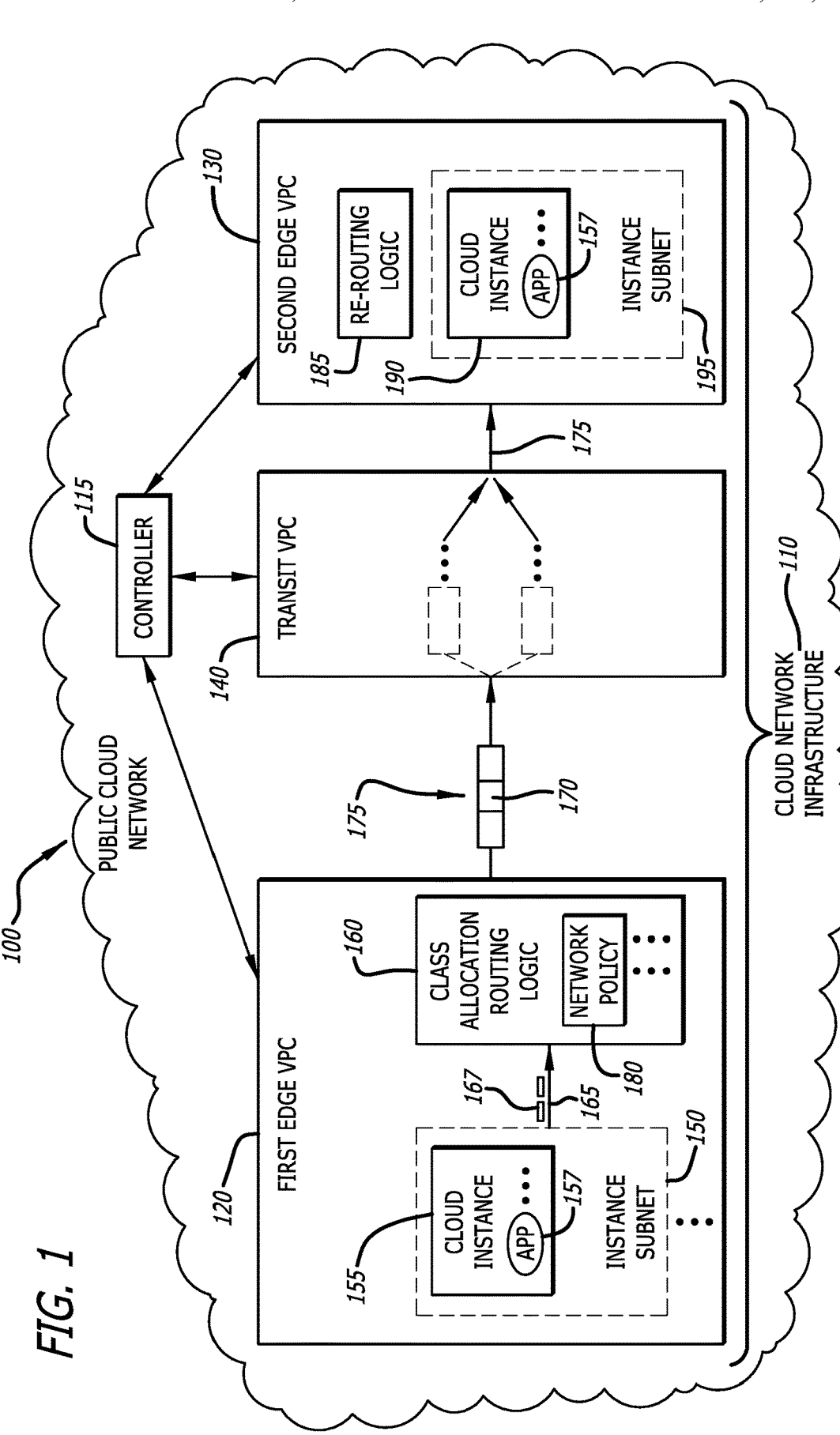
FIG. 1 is a first exemplary embodiment of a cloud network infrastructure that performs policy-based data flow classification.

Embodiments of a system and method directed to an improved cloud network infrastructure based on a policy-based, data traffic management scheme is described. The cloud network infrastructure supports policy-based routing of a data flow (e.g., a message or a series of messages), which may be achieved through assignment of a classification identifier to each data flow propagating over a cloud network infrastructure. The classification identifier (hereinafter, "ClassID") identifies the type of data flow, where such identification is predicated on which user-defined network policy (or which group of two or more network policies) includes requirements regarding the forwarding of data flows that are satisfied by certain attributes associated with the source and/or destination of the data flow and attributes of the flow itself. Herein, the ClassID may correspond to a determined network policy (e.g., one-to-one mapping between each ClassID and a corresponding network policy) or the ClassID may correspond to a certain group (combination) of network policies. The use of the ClassID would provide a more reliable association between applications and their data flows propagating over the cloud network as well as the context of the data flow itself.

One embodiment of the cloud network infrastructure may pertain to a load-balanced, full-mesh network within a public cloud network, which has been configured to mitigate disruption of communications directed to or from virtual private cloud networks (VPCs) due to communication link failures. The full-mesh network may be accomplished by establishing (i) cloud-based networking infrastructures that operate as virtual private cloud networks at the edge of the cloud network (hereinafter, "edge VPCs") and (ii) a cloud-based networking infrastructure operating as a virtual private cloud network that supports the propagation of data traffic from one VPC to another (hereinafter, "transit VPC").

Herein according to one embodiment of the disclosure, a first edge VPC may include at least one gateway (hereinafter, "ingress gateway"), which are communicatively coupled to one or more cloud instances (e.g., each cloud instance may support one or more applications). A second edge VPC may include at least one gateway (hereinafter, "egress gateway"), which is communicatively coupled to one or more cloud instances as well. The ingress gateway and the egress gateway may be communicatively coupled to a set of (e.g., two or more) gateways deployed within the transit VPC (hereinafter, "transit gateways") via one or more peer-to-peer communication links operating in accordance with a secure network protocol such as Internet Protocol Security (IPSec) tunnels for example. Each of these gateways may be accessed in accordance with a unique Classless Inter-Domain Routing (CIDR) routing address to propagate messages over the network.

As described below, each ingress gateway is configured to assign a ClassID to an incoming data flow based on attributes associated with the data flow being in compliance with, and thereby satisfying, certain requirements of one or more of the network policies defined for the cloud network infrastructure by an administrator for a particular user (e.g., company, consortium, etc.). Herein, a network policy generally specifies a desired state, which may be represented by a collection of requirements that govern the forwarding of data flows (messages) between network devices such as the gateways. These network devices may be physical network devices or virtual network devices (e.g., software constructs operating as a particular network device).

Herein, according to one embodiment of the disclosure, the ClassID may be represented as a 24-bit or 32-bit value, which may be assigned with "local" granularity (e.g., ClassID only pertains to a segment of a data flow between neighboring network devices for that communication session) or may be assigned with "global" granularity (e.g., ClassID is unique and pertains to a particular data flow for any communications throughout the private cloud network). The "global" ClassID reduces complexity in flow analytics (e.g., sampling of the propagation of particular messages) and improves overall network efficiency as the rate of change of ClassIDs is diminished to reduce the frequency of gateway configuration changes being made by the controller to address ClassID changes) and shall be discussed hereinafter.

According this embodiment of the disclosure, the attributes associated with the data flow may be based, at least in part, on static attributes and dynamic attributes. The static attributes associated with the data flow may be ascertained from information associated with the ingress gateway, given that the ingress gateway is co-located with an application of a cloud instance that is the source of the data flow. Examples of static attributes may include, but are not limited or restricted to location-based attributes (e.g., same cloud region, same cloud zone, same geo-location such as country, state, city, community or other geographic area, same cloud provider, etc.). In contrast, the dynamic attributes may be obtained from content of the data flow, such as through the use of the source address of the data flow as an index to an address-to-attribute mapped data store, as described below.

As another example, the ClassID may be determined through a decision tree structure, which may assign the resultant ClassID based on which network policy or combination of network policies is most closely correlated to certain attributes associated with the data flow. Alternatively, the ClassID may be at the controller level in which data flows associated with each application is classified and an IP address to ClassID mapping table is provided to each ingress gateway by the controller. Independent of the type of ClassID determination process, the number of ClassIDs may correspond to the number of network policies so that ClassIDs change only when requirements associated with a particular network policy change.

According to another embodiment of the disclosure, the ClassID may be determined through use of an Application Programming Interface (API). For this embodiment, the ingress gateway, operating as an egress gateway of a Kubernetes cluster being part of the first edge VPC, accesses the API to retrieve attributes associated with the data flow. These attributes may include attributes associated with the source application for example. Based on these attributes along with attributes acquired from the data flow itself, the ClassID value may be determined in accordance with a decision tree or other type of deterministic scheme. According to yet another embodiment of the disclosure, the ClassID may be obtained based on information included as part of a certificate exchanged between the source application and the ingress gateway, operating as an egress gateway with the service mesh deployment, as described below.

Further details of the logic associated with one embodiment of the load-balanced, full-mesh network system architecture are described below:

Instance Subnets: Multiple instance subnets may be supported by an edge VPC so that data flows from a cloud instance of a particular instance subnet are forwarded to a selected ingress gateway.

Cloud Instance: A collection of software components that are configured to receive incoming data flows (one or more messages) and/or transmit outgoing data flows within a cloud network. As an illustrative example, the cloud instance may be comprised of a virtual web server, a plurality of applications being processed by the virtual web server, and a database maintained by the virtual web server. For this and other configurations, the cloud instance may generate (and transmit) different types of data flows that are classified differently depending on the attributes of the data flows. For example, data flows initiated by a backup agent being a first application of the applications operating on the web server would be classified differently than a browser application being one of the plurality of applications associated with the same cloud instance.

Gateways: Multiple gateways may be deployed in one or more VPCs to control the routing of data flows from a cloud instance, including a source application, to a cloud instance inclusive of a destination application. Having similar architectures, the gateways may be identified differently based on their location/operability within a cloud network. The "ingress" gateways are configured to interact with cloud instances including applications while "transit" gateways are configured to further assist in the propagation of data flows (e.g., one or more messages) directed to an ingress gateway within another edge VPC.

IPSec tunnels: Secure peer-to-peer communication links established between gateways, where the gateways may be located within the same VPC or located within different, neighboring VPCs. The peer-to-peer communication links are secured through a secure network protocol suite referred to as "Internet Protocol Security" (IPSec). With respect to one embodiment of a full-mesh network deployment, as an illustrative example, where an edge VPC may include "M" gateways (e.g., M≥1) and a neighboring (transit) VPC has N gateways (N≥1), Mx N IPSec tunnels may be created between the edge VPC and the transit VPC. These IPSec tunnels are represented in gateways by virtual tunnel interfaces (VTI) and the tunnel states are represented by VTI states.

Gateway routing: In gateway routing table, routing paths between a gateway and an IP addressable destination to which the tunnel terminates (e.g., another gateway, on-prem computing device, etc.), identified by a virtual tunnel interface (VTI) for example, may be governed, at least in part, by the ClassID generated at the ingress gateway. The routing paths may be further governed, at least in part, on analytics conducted on certain information associated with data traffic (e.g., 5-tuple—Source IP address, Destination IP address, Source port, Destination port, selected transmission protocol). If any of the IPSec tunnels state is changed or disabled (or re-activated), the corresponding VTI may be removed (or added) from consideration as to termination points for the selected routing path.

I. Terminology

In the following description, certain terminology is used to describe features of the invention. In certain situations, the terms "logic" and "device" is representative of hardware, software or a combination thereof, which is configured to perform one or more functions. As hardware, the logic (or device) may constitute control logic, which may include circuitry having data processing or storage functionality. Examples of such control circuitry may include, but are not limited or restricted to a processor (e.g., a microprocessor, one or more processor cores, a microcontroller, controller, programmable gate array, an application specific integrated circuit, etc.), wireless receiver, transmitter and/or transceiver, semiconductor memory, or combinatorial logic.

Alternatively, or in combination with the hardware circuitry described above, the logic (or network device) may be software in the form of one or more software modules. The software module(s) may include an executable application, an application programming interface (API), a subroutine, a function, a procedure, an applet, a servlet, a routine, source code, a shared library/dynamic load library, or one or more instructions. The software module(s) may be coded as a processor, namely a virtual processor.

The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As software, the logic may operate as firmware stored in persistent storage.

The term "computerized" generally represents that any corresponding operations are conducted by hardware in combination with software.

The term "gateway" may be construed as a virtual or physical logic. For instance, as an illustrative example, the gateway may correspond to virtual logic in the form of a software component, such as a virtual machine (VM)-based data routing component that is assigned a Private IP address within an IP address range associated with a VPC including the gateway. The gateway allows Cloud Service Providers (CSPs) and enterprises to enable datacenter and cloud network traffic routing between virtual and physical networks, including a public network (e.g., Internet). Alternatively, in some embodiments, the gateway may correspond to physical logic, such as an electronic device that is communicatively coupled to the network and assigned the hardware (MAC) address and IP address.

The term "cloud network infrastructure" generally refers to a combination of software components (e.g., instances) generated based on execution of certain software by hardware associated with the public cloud network. Each software component (or combination of software components) may constitute a virtual network resource associated with the public cloud network, such as a virtual switch, virtual gateway, or the like.

The term "message" generally refers to information in a prescribed format and transmitted in accordance with a suitable delivery protocol. Hence, each message may be in the form of one or more packets, frames, or any other series of bits having the prescribed format. A "data flow" generally refers to as one or more messages transmitted from a source (e.g., a first application instance or other software component) to a destination (e.g., a second application instance or other software component).

The term "communication link" may be construed as a physical or logical communication path between two or more network devices. For instance, as a physical communication path, wired and/or wireless interconnects in the form of electrical wiring, optical fiber, cable, bus trace, or a wireless channel using infrared, radio frequency (RF), May be used. As a logical communication path, the communication link may be an Application Programming Interface (API) or other software construct that provides for a transfer of information between two software components that may constitute two network devices with logical representations.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Cloud Network Infrastructures

Referring to FIG. 1, a first exemplary embodiment of a cloud network infrastructure 110, which is deployed within a public cloud network 100 and is accessible to users associated with a particular enterprise. Herein, the cloud network infrastructure 110 includes a collection of virtual private cloud networks (VPCs), which support reliable communications between one or more cloud instances residing in different VPCs. The cloud network infrastructure 110 may be configured to operate as a load-balanced, full-mesh network as described in U.S. patent application Ser. No. 17/079,399 filed Oct. 23, 2020 entitled "Active Mesh Network System and Method," the entire contents of which are incorporated by reference herein.

According to this embodiment of the disclosure, as shown, the cloud network infrastructure 110 may be configured to multiple VPCs managed by a controller 115. Herein, the controller 115 is communicatively coupled to provide information to one or more virtual network devices within these VPCs to perform data flow classification through user-defined network policies and control data flow routing relying, at least in part, on the classification identifier (hereinafter, "ClassID") of the data flow.

Herein, the VPCs include a first VPC (hereinafter, "first edge VPC") 120, a second edge VPC 130 and a third VPC (hereinafter, "transit VPC") 140. The transit VPC 140 enables communications between the first edge VPC 120 and the second edge VPC 130. Although two edge VPCs 120 and 130 are illustrated in FIG. 1 for clarity sake, it is contemplated that the cloud network infrastructure 110 may deploy additional edge VPCs and multiple transit VPCs.

As shown, the first edge VPC 120 is configured with one or more instance subnetworks 150 (hereinafter, "subnets"), where each of these instance subnets 150 may include one or more cloud instances. As shown, an application 157 within a cloud instance of a cloud subnet 150 (e.g., cloud instance 155) may be configured to exchange data flows with class allocation routing logic 160. The class allocation routing logic 160 may be configured to (i) analyze content (e.g., header information, meta-information, etc.) associated with each message of an incoming data flow 165 from the source application 157, (ii) assign a ClassID 170 to the data flow 165, and (iii) encapsulate the ClassID 170 into a message (or each of the messages) associated with the data flow 165.

Herein, according to one embodiment of the disclosure, the content of the data flow 165 may be analyzed to identify certain attributes 167 associated with the data flow 165. These attributes 167 may be identified by accessing an attribute lookup data store (not shown) provided from the controller 115, where a portion of a 5-tuple (e.g., a value based on one or more elements of the 5-tuple—Source IP address, Destination IP address, Source port, Destination port, transport protocol) may be used to access certain attributes associated with source application 157 and/or destination application). Based on these attributes 167, the class allocation routing logic 160 may determine a user-defined network policy 180 that is directed to this type of data flow 165. The ClassID 170 is predicated on which network policy 180 (and its requirements) are correlated with (and satisfied by) the identified attributes 167 of the data flow 165.

Thereafter, the encapsulation scheme for placement of the ClassID 170 into the message(s) associated with the data flow 165, which produces a classified data flow 175, may be dependent on the transmission protocol supported by the cloud network infrastructure 110, as illustrated in FIGS. 8A-8E. In general, the ClassID 170 may be encapsulated into a tunneling header for each of the message(s) to form the classified the data flow 175.

The transit VPC 140 forwards the classified data flow 175 through different gateways, where the forwarding may be influenced by the ClassID 170. Re-routing logic 185, being a component of the second edge VPC 130, may be configured to remove the ClassID 170 from the classified data flow 175 and direct contents of the originally transmitted data flow 165 to a targeted destination cloud instance 190 being part of an instance subnet 195 supported by the second edge VPC 130.

Figure 2:
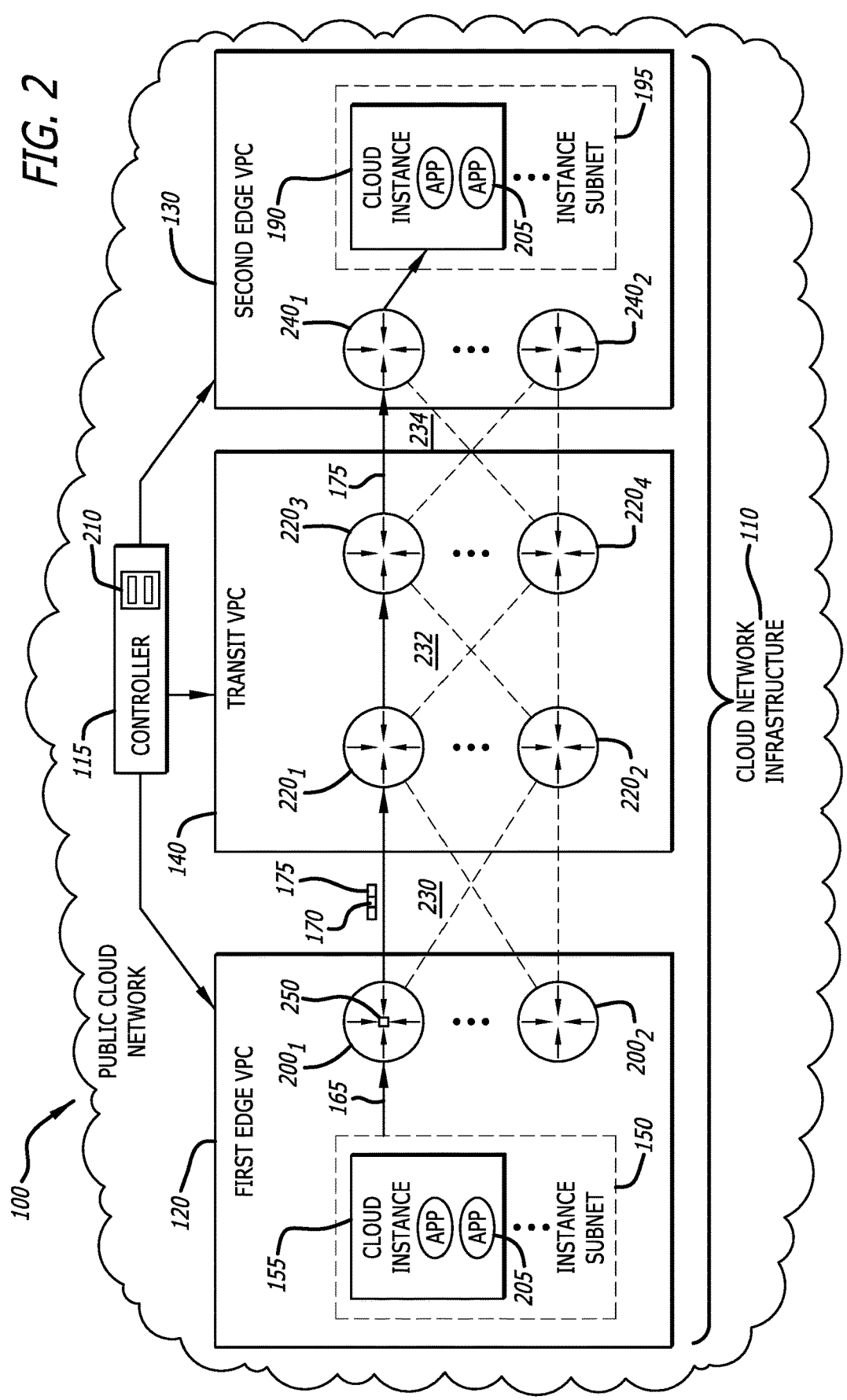
FIG. 2 is a more detailed representation of the cloud network infrastructure of FIG. 1.

Referring now to FIG. 2, a more detailed representation of the exemplary embodiment of the cloud network infrastructure 110 of FIG. 1, which includes the first edge VPC 120 and the second edge VPC 130 communicatively coupled via the transit VPC 140, is shown. Herein, the first edge VPC 120 is configured with the instance subnet(s) 150, where the cloud instance 155 within the instance subnet 150 is configured to exchange data flows with the class allocation routing logic 160, namely a gateway of a set of (e.g., two or more) gateways $200_1$-$200_M$ ($M \geq 2$) maintained in the first edge VPC 120. Herein, these gateways $200_1$-$200_M$ are referred to as "ingress gateways" $200_1$-$200_M$.

More specifically, the controller 115 for the cloud network infrastructure 110 is configured to manage communications between the instance subnet(s) 150 and the set of ingress gateways $200_1$-$200_M$ through use of a VPC routing table 210, which is initially configured to identify which ingress gateway $200_1$ . . . or $200_M$ is responsible for interacting with which instance subnets 150 or cloud instances. According to one embodiment of the disclosure, each of the cloud instances 155 may be comprised of multiple software components operating collectively as a virtual resource. For example, as described above, the cloud instance 155 may correspond to a virtual web server configured to execute a plurality of applications 205, where these applications 205 may generate and output different types of data flows 165.

Referring still to FIG. 2, according to one embodiment of the disclosure, the cloud network infrastructure 110 may be accomplished by peering the set of ingress gateways $200_1$-$200_M$ deployed within the edge VPC 120 to a set of gateways $220_1$-$220_N$ ($N \geq 2$) deployed within the transit VPC 140, which may be referred to as "transit gateways" $220_1$-$220_N$. For ease of illustration, the set of ingress gateways $200_1$-$200_M$ is represented as a first ingress gateway $200_1$ and a second ingress gateway $200_2$, although three or more ingress gateways may be deployed within the edge VPC 120. Similarly, the set of transit gateways $220_1$-$220_N$ is represented by a first transit gateway $220_1$ and a second transit gateway $220_2$, although three or more transit gateways may be deployed within the transit VPC 140.

As shown, the ingress gateway $200_1$ is configured for communications with transit gateways $220_1$-$220_2$ via peer-to-peer communication links 230. In particular, according to one embodiment of the disclosure, the ingress gateway (e.g., ingress gateway $200_1$) may be communicatively coupled to each of the transit gateways $220_1$-$220_2$ via multiple, active peer-to-peer communication links. Similarly, as shown for illustrative purposes, the transit gateway $220_3$-$220_4$ may be communicatively coupled to other transit gateways (e.g., transit gateways $220_1$-$220_2$) via peer-to-peer communication links 232 as well as a set of gateways $240_1$-$240_P$ ($P \geq 2$) maintained in the second edge VPC 130 via peer-to-peer communication links 234. Herein, these gateways $240_1$-$240_P$ are referred to as "egress gateways" $240_1$-$240_P$. Also, the peer-to-peer communication links 230, 232 and/or 234 may constitute cryptographically secure tunnels, such as IPSec tunnels. The management of the IPSec tunnels 230, 232 and 234 may be accomplished through gateway routing tables (not shown) maintained by each of the respective gateways $200_1$-$200_2$, $220_1$-$220_4$ and $240_1$-$240_2$.

With respect to operation, the first edge VPC 120 is configured with one or more instance subnets 150, which include a plurality of cloud instances inclusive of cloud instance 155. Cloud instance 155 is configured to provide the data flow 165 to the ingress gateway $200_1$. The ingress gateway $200_1$ is configured to analyze content of the data flow 165 and assign the ClassID 170 thereto. The ClassID 170 is predicated on which network policy from a group of network policies 250 includes requirements have a high degree of correlation to attributes of the incoming data flow 165. For instance, according to one embodiment of the disclosure, the ClassID 170 may be based, at least in part, on which network policy 180 from the group of user-defined network policies 250 is composed of requirements that correlate to attributes of the data flow 165.

More specifically, after formulation of the network policies 250 and receipt of the incoming data flow 165, the ingress gateway $200_1$ is configured to analyze content of the data flow 165 by determining its attributes 167. These the attributes 167 may include static attributes 260 and dynamic attributes 265.

According to one embodiment of the disclosure, the static attributes 260 may be available from properties associated with the ingress gateway $200_1$ based on the co-location of both the ingress gateway $200_1$ and the cloud instance 155. Examples of the static attributes 260 may include information associated with the location of the cloud instance 155 including a source application for the data flow 165, which would be the same location as the ingress gateway $200_1$ (e.g., cloud provider, cloud region, cloud zone, geo-location such as country, state, city, community or other sub-areas). The dynamic attributes 265 may be available to the ingress gateway $200_1$ through an IP-address-to-attribute mapping 270 provided by the controller 115. The mapping 270 identifies attributes that may be applicable to the source application. These attributes may include, but are not limited or restricted to the following attributes set forth in Table A:

TABLE A

| SOURCE ATTRIBUTES | WORKLOAD ATTRIBUTES |
|---|---|
| IAM role (if an instance or container) | Tags |
| Service account (if Kubernetes container) | Namespace (if Kubernetes container) |
| Project ID | Labels (if Kubernetes container) |
|  | Destination Kubernetes Service (if Kubernetes container) |
| NETWORK ATTRIBUTES | OSI APPLICATION LAYER DATA |
| VPC/Virtual Network | Layer-7 protocol |
| Security Group (if an instance) | Layer-7 requests |

Thereafter, the ClassID 170 may be determined, at least in part, based on the values of some or all of these attributes 260 and 265.

According to other embodiments of the disclosure, the ClassID 170 may be determined, at least in part, through a decision tree analysis that associates values for particular attributes to decisions that would represent a correlation with requirements of a network policy.

Figure 3:
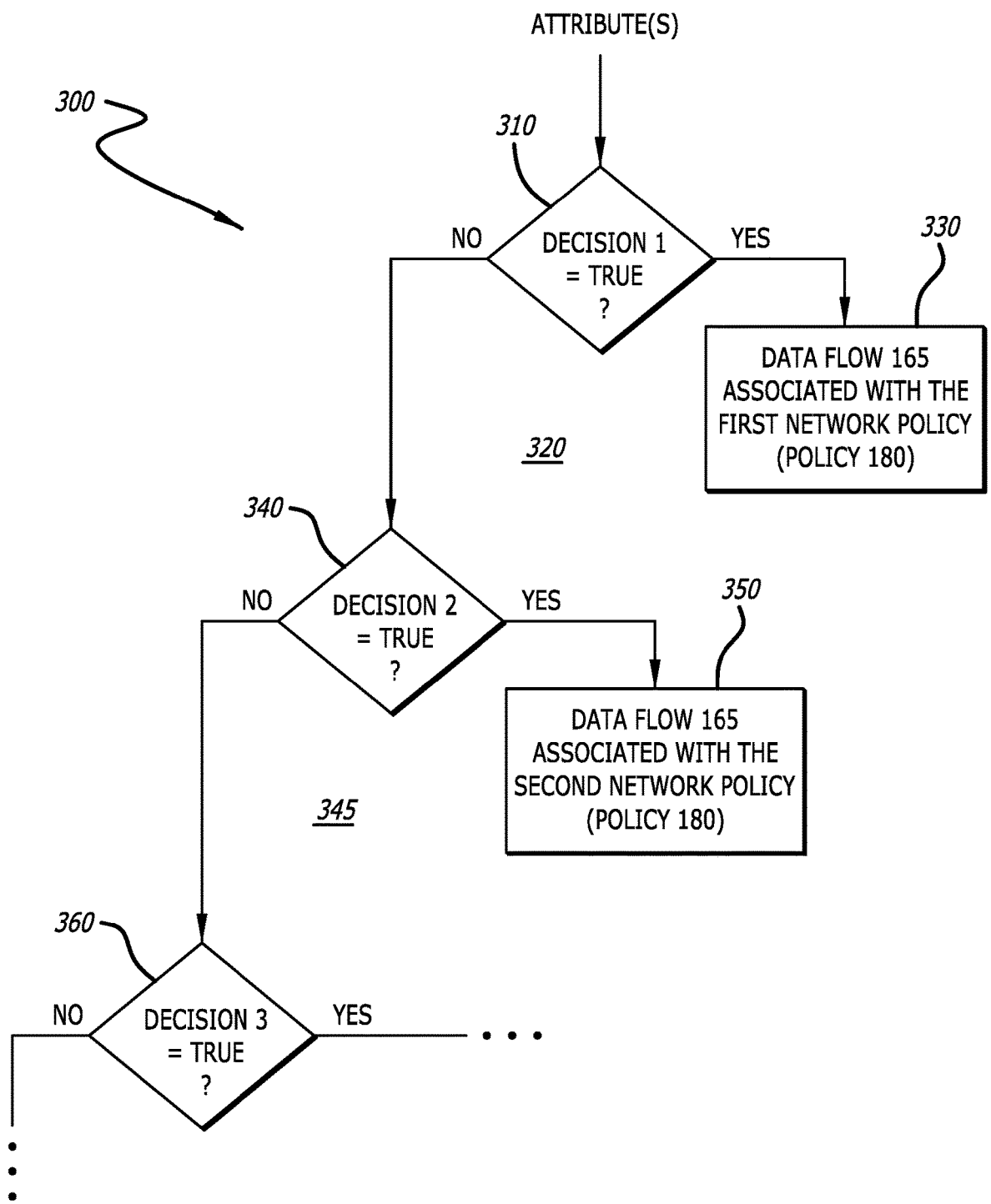
FIG. 3 is an exemplary decision tree structure illustrative of a determination of a network policy or network policies associated with a data flow conducted by the ingress gateway within the cloud network infrastructure of FIG. 1.

As an illustrative example, a decision tree structure 300 for use in determining a network policy or network policies associated with the data flow 165 is shown in FIG. 3. Herein, the decision tree structure 300 may feature decisions 310 based on a presence (or absence) of particular attributes and/or the value of these attributes. A result of a first decision 320 may identify that the data flow 165 is associated with a first network policy 330 or is subject to a second decision 340. Similarly, based on the second decision 340, a result 345 is produced that identifies the data flow 165 is associated with a second network policy 350 or is subject to a third decision 360. This decision-tree analyses are conducted until the network policy 180 is determined. Upon determining the network policy associated with the data flow 165, the ingress gateway $200_1$ may assign a ClassID corresponding to that network policy or group of network policies to which the attributes of the data flow 165 are highly correlated.

Referring back to FIG. 2, the manner of encapsulation of the ClassID 170 into the data flow 165, which produces the classified data flow 175, may be dependent on the transmission protocol supported by the cloud network infrastructure 110. For example, where the data flow 165 constitutes one or more UDP-based IP packets, the ClassID 170 may be implemented with an encrypted body segment (e.g. after the ESP header, after the Wireguard header, etc.) as shown in FIGS. 8A-8E and described below.

The transit VPC 140 forwards the classified data flow 175 through different transit gateways $220_1$-$220_4$, where the forwarding may be influenced by the ClassID 170. For instance, the ClassID 170 may be used to determine which of the communication links 232 to use in routing the classified data flow to the egress gateway $240_1$. Additionally, each of the transit gateways $220_1$-$220_4$ may be configured to conduct filtering operations based, at least in part, on the ClassID 170 in lieu of conventional firewall techniques of relying on source or destination IP addresses. As an example, a transit gateway (e.g., transit gateway $220_1$) may conduct traffic limiting operations by eliminating data flows exceeding a certain size (in bytes), exceeding a certain burst size or burst length, exceeding a bandwidth threshold, constituting a particular type of data flow that is precluded from transmission at all (or to a particular application or to a particular edge VPC), or the like.

Egress gateway $240_1$, being a component of the second edge VPC 130, is responsible for removing the ClassID 170 from the classified data flow 165 and directing contents of the data flow 165 to a targeted destination cloud instance 190 being part of the subnet 195 supported by the second edge VPC 130.

III. General Classification Architecture

A. IP Classifier

Figure 4A:
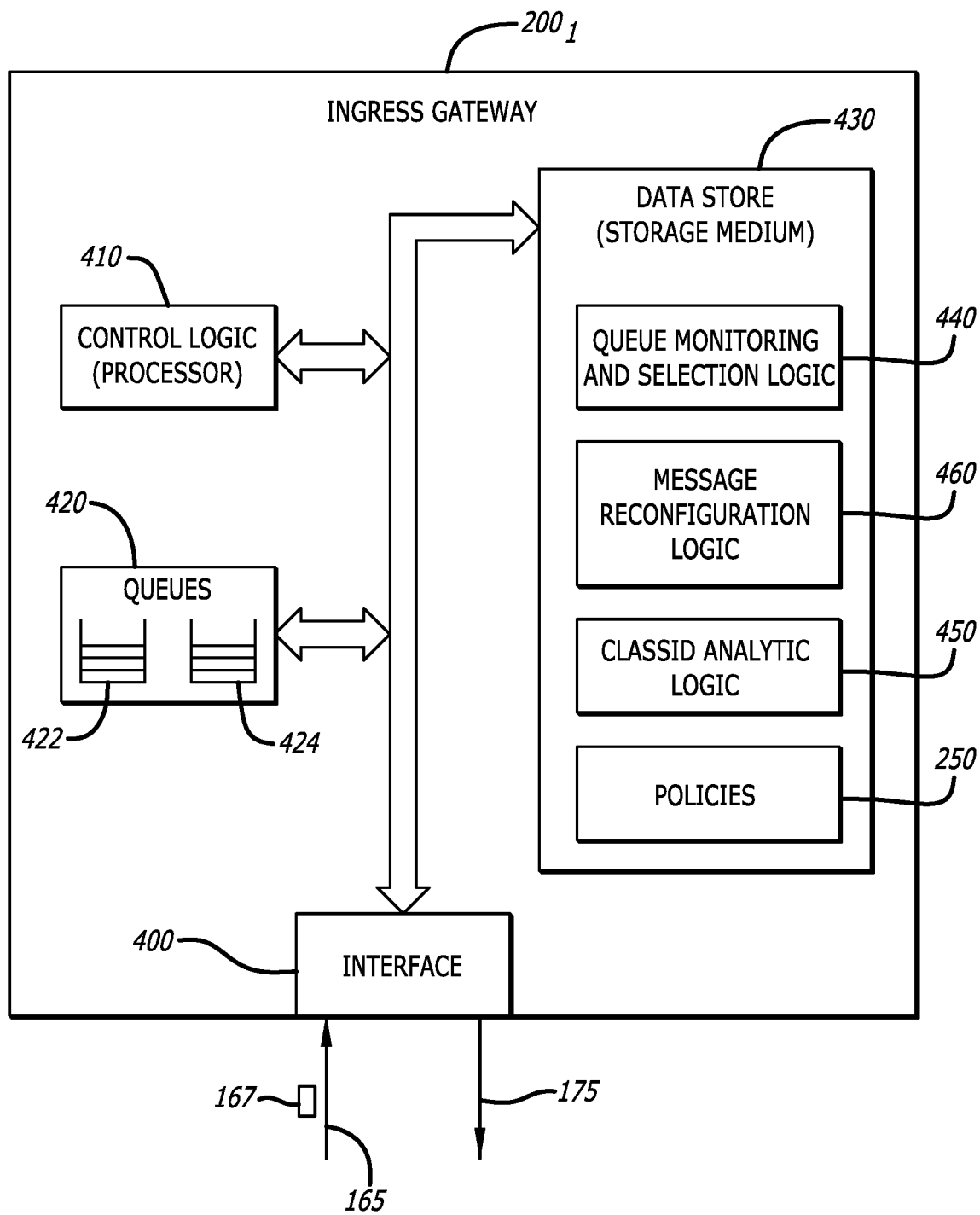
FIG. 4A is a first exemplary embodiment of a logical architecture of the ingress gateway of FIG. 2.

Referring now to FIG. 4A, a first exemplary embodiment of a logical architecture of the ingress gateway $200_1$ of FIG. 2 is shown. Herein, the ingress gateway $200_1$ includes an interface 400, control logic 410, queues 420 and non-transitory storage medium (e.g., data store) 430. The data store 430 features queue monitoring and selection logic 440, ClassID analytic logic 450, message reconfiguration logic 460 and the network policies 250. The ingress gateway $200_1$ is configured to receive the data flow 165 (e.g., one or more messages) via the interface 400 and to generate the ClassID 170 associated with the data flow 165 for transmission, as part of the data flow 165, from the interface 400.

As shown, the queues 420 may be incoming queues 422 and/or outgoing queues 424. For instance, after receipt via the interface 400, the content associated with the data flow 165 may be temporarily maintained within the incoming queues 422 prior to analysis by the ClassID analytic logic 450. The outgoing queues 424 may also be used as temporary storage for the classified data flows 175 awaiting transmission from the ingress gateway $200_1$. The outgoing queues 424 may be structured in accordance with a classification priority in which transmission of the classified data flows 175 may be prioritized based on the assigned ClassID. In general, the queuing policy may be based, at least in part on the ClassID assigned to the data flow 165.

More specifically, the queue monitoring and selection logic 440, executed by the control logic 410 (e.g., one or more processors) may detect storage of content associated with the data flow 165 within the incoming queues 422 and signals the ClassID analytic logic 450 accordingly. The ClassID analytic logic 450 is configured to (i) determine which of the network policies 250 is applicable to the data flow 165 and (ii) assign the ClassID 170 in accordance with the determined network policy. For example, the ClassID 170 may be selected by determining, based on the attributes 167 of the data flow 165, which requirements of the network policies 250 correlate to these attributes 167. The ClassID 170 may correspond to the network policy or group of network policies with requirements that best correlate to the attributes of the data flow 165.

Additionally, the message reconfiguration logic 460 is adapted to encapsulate the ClassID 170 appropriately into the data flow 165 to generate the classified data flow 175 for transmission directed to a targeted cloud instance. Additionally, the message reconfiguration logic 460 may include route prediction logic to select the particular transit gateway and communication link to receive the classified data flow. Such selection may be based, at least in part, on the ClassID 170 encapsulated into the classified data flow 175. For example, the classified data flow 175 may be routed to a particular transit gateway $220_2$, which is configured with a certain security policy that is needed for the particular data flow (e.g., transit gateway $220_2$ supports Payment Card Industry Data Security Standard "PCI DSS" in the event that the classified data flow 175 is credit card information.

Concurrent (e.g., at least partially overlapping in time) or after the above-described operations of the message reconfiguration logic 460, the queue monitoring and selection logic 440, executed by the control logic 410, may select one of the outgoing queues 424 based on the ClassID 170 associated with the data flow 165 and encapsulated into the classified data flow 175. The outgoing queues 424 may be assigned certain priorities so that classified data flows 175 associated with a particular ClassID may be transmitted in advance of classified data flows 175 associated with another ClassID.

Figure 4B:
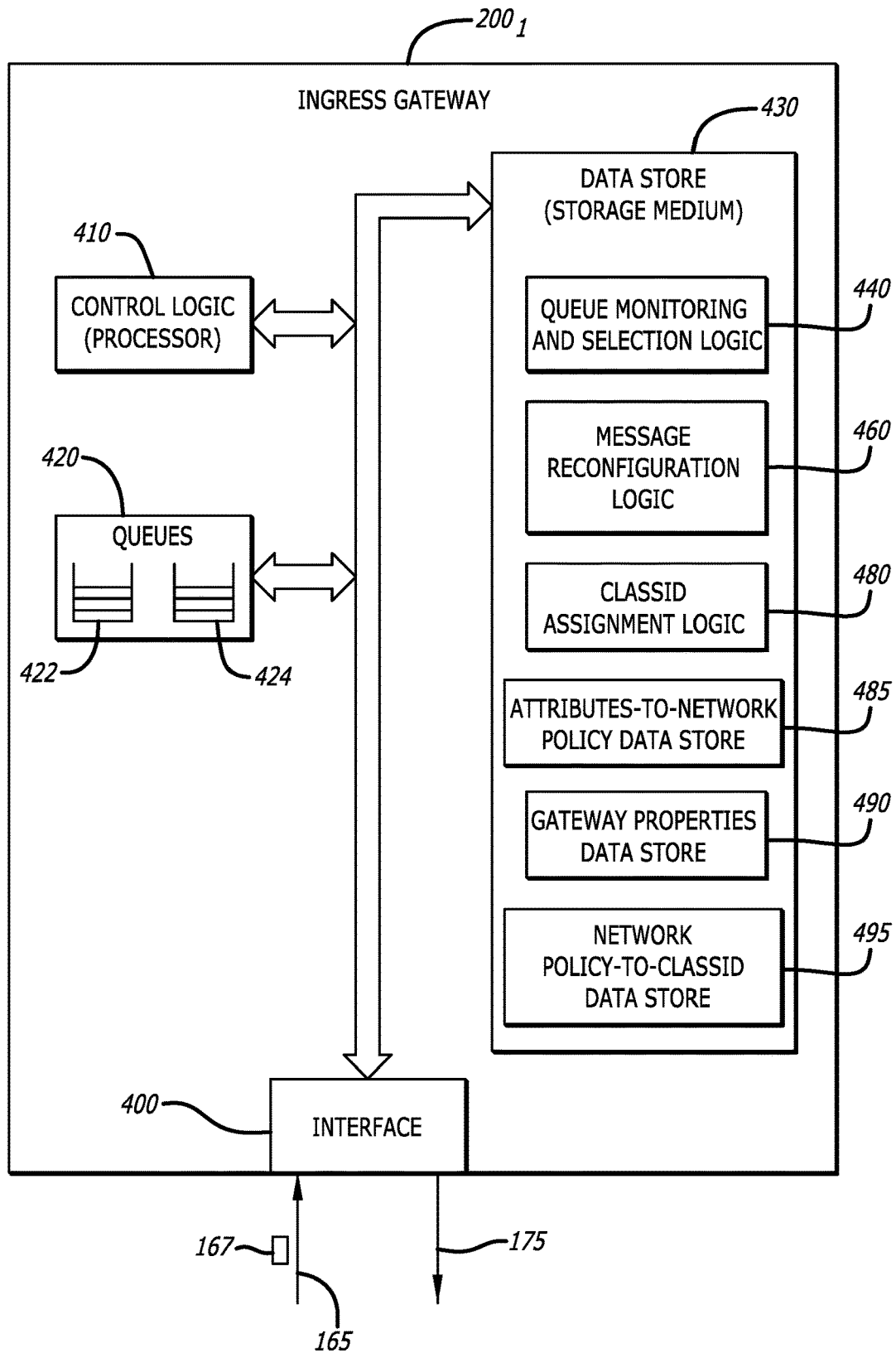
FIG. 4B is a second exemplary embodiment of a logical architecture of the ingress gateway of FIG. 2.

Referring to FIG. 4B, a second exemplary embodiment of a logical architecture of the ingress gateway $200_1$ is shown. Herein, the ingress gateway $200_1$ includes the interface 400, the control logic 410, the queues 420 and the non-transitory storage medium (e.g., data store) 430 as illustrated in FIG. 4A. However, in lieu of the one type of flow analytic logic (e.g., ClassID analytic logic) 450, the data store 430 includes a ClassID assignment logic 480 is configured to operate in combination with an attributes-to-network policy data store 485, gateway properties data store (for static attributes) 490, and an Network Policy-to-ClassID data store 495. Herein the ClassID assignment logic 480 is configured to determine the network policy 180 from the network policies 250 that is applicable to the data flow 165 by at least accessing static attributes from the gateway properties data store 490 and dynamic attributes from the content of the data flow 165. Collectively, certain attributes (e.g., static, dynamic or a combination of static and dynamic attributes) may be used to determine which of the network policies 250 are applicable to the data flow 165. Thereafter, the ClassID assignment logic 480 accesses the Network Policy-to-ClassID data store 495 to determine the ClassID 170 associated with the data flow 165 originating from the cloud instance 155. Of course, as an alternative embodiment (not shown), the ClassID assignment logic 480 may simply access a prescribed table based on the attributes-to-ClassID relationship.

Figure 5:
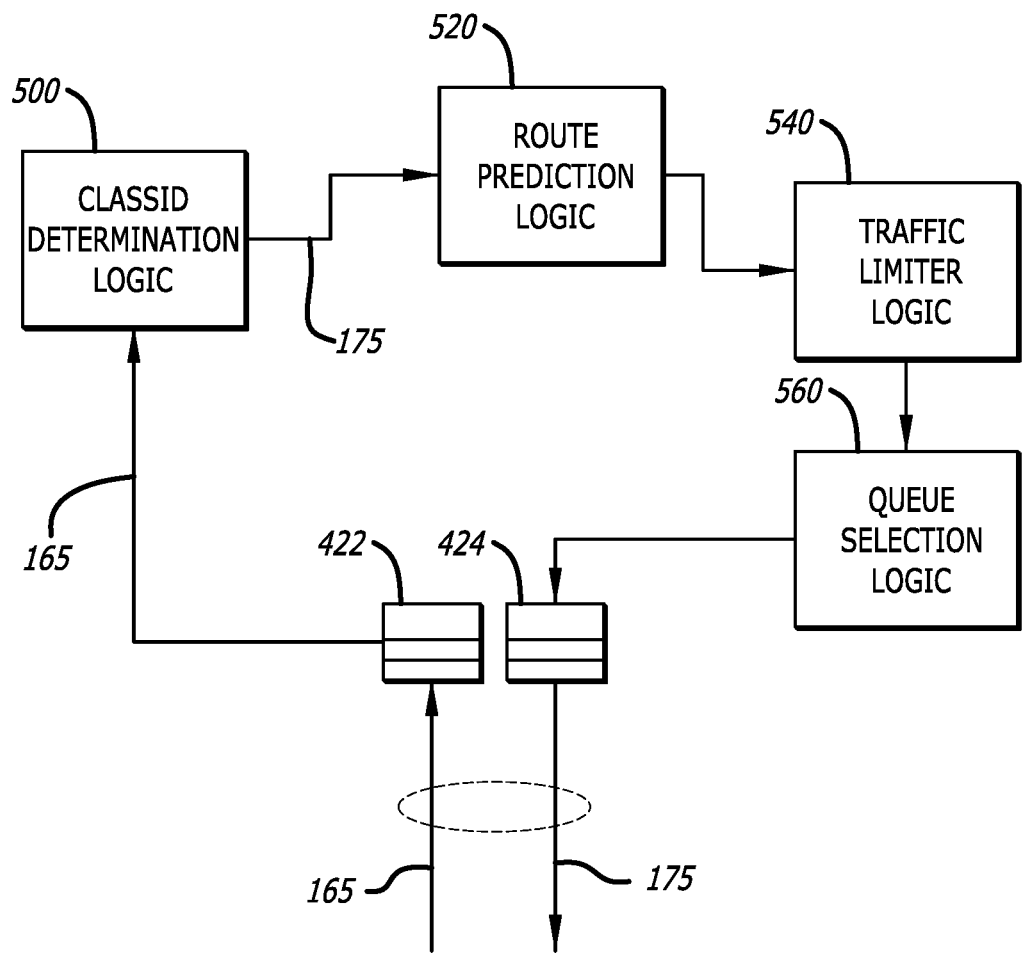
FIG. 5 is an exemplary embodiment of the general logical operations of the ingress gateway of FIG. 2.

Referring now to FIG. 5, an exemplary embodiment of the general logical operations of the ingress gateway $200_1$ of FIG. 2 is shown. Herein, the ingress gateway $200_1$ includes ClassID assignment logic 500, route prediction logic 520, traffic limiter logic 540, and queue selection logic 560. Herein, the incoming data flow 165 is received by the ClassID assignment logic 500, which assigns a ClassID to the data flow 165 based on which network policy (or policies) are applicable to the data flow 165. The ClassID 170 is encapsulated within the data flow 165 to generate the classified data flow 175. The classified data flow 175 is provided to the route prediction logic 520.

The route prediction logic 520 is configured to determine the particular transit gateway and corresponding communication link to receive the classified data flow 175 for routing to a targeted application. This determination may be based, at least in part, on the selected ClassID 170. The traffic limiter logic 540 is configured to receive the classified data flow 175 and to "shape" the traffic by controlling propagation of the classified data flow through filtering. The queue selection logic 560 determines which outgoing queues 424 to receive the classified data flows 175, especially when different outgoing queues 424 are assigned different priorities.

B. Kubernetes Classifier

Figure 6:
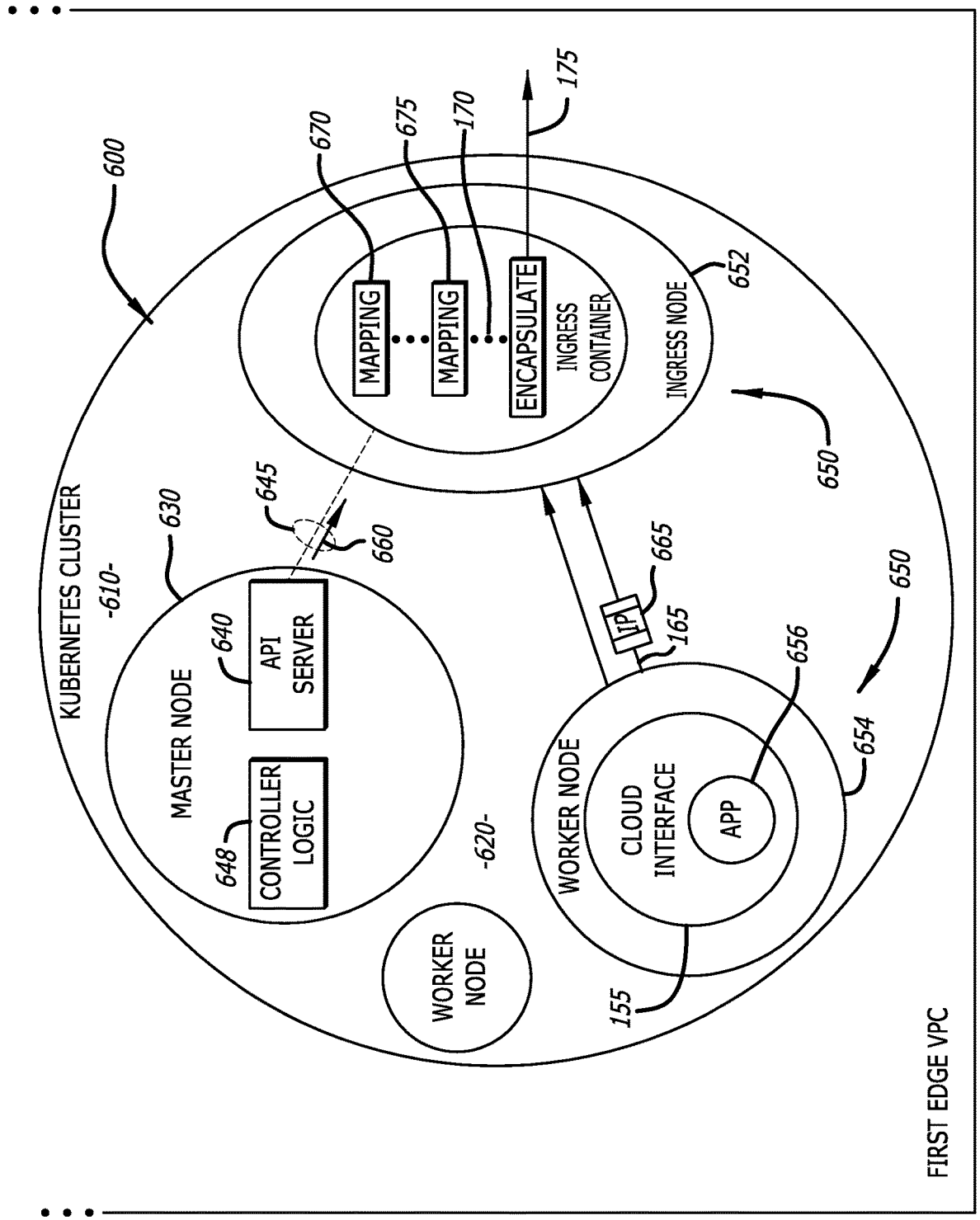
FIG. 6 is second exemplary embodiment of a cloud network infrastructure including the second type of classifier that performs policy-based data flow classification.

Referring now to FIG. 6, a second exemplary embodiment of a cloud network infrastructure 600 including a second type of classifier that performs policy-based data flow classification is shown. Herein, a Kubernetes cluster 610 may be deployed as part of the first edge VPC 120. In general, Kubernetes is open-source orchestration software for deploying, managing, and scaling containers. The Kubernetes cluster 610 features a plurality of nodes 620, including a master node 630 and one or more worker nodes 650. The nodes 620 can be either physical network devices or virtual network devices (e.g., virtual machines) as shown.

According to one embodiment of the master node 630 controls the state of the Kubernetes cluster 610 while the worker node(s) 650 are the components that perform tasks (e.g., running applications, etc.) assigned by the master node 630. In general, the master node 630 may feature an API server 640 that exposes a Representational State Transfer (RESTful) API interface 645 to all Kubernetes resources and provides for communications with controller logic 648 with certain functionality associated with the controller 115 of FIG. 2. The controller logic 648 may be provided access to local storage populated by the controller 115 of FIG. 2 with an IP/Attribute mapping, where the "IP" may be the IP address of the source application for example. It is contemplated that the mapping may pertain to involve 5-tuple characteristics associated with the messages of the data flow 165.

As shown, each of the worker nodes 650 may be configured with one or more containers, namely logical devices that run an application. Herein, a first worker node 652 may include one or more containers operating as the ingress gateway $200_1$ of FIG. 2, hereinafter "ingress node" 652. Upon receipt of the data flow 165 from another worker node 654 (e.g., a virtual machine operating as the cloud instance 155 of FIG. 1 operating as source application such as a web browser application), the ingress node 652 is configured to access the API server 640 via the API interface 645 to obtain attributes 660 associated with the data flow 165 from the controller logic 648. These attributes 660 may be obtained based on an IP address 665 of the source application 654. These attributes 600 may be combined with attributes associated with the source application 656.

Thereafter, from the attributes 660 along with attributes included as part of the data flow 165, the ingress node 652 is configured to determine the network policy 180 (or group of network policies) comporting with the data flow 165 (e.g., via a decision-tree analysis or other type of deterministic scheme) based on an attribute-policy mapping 670 provided from the controller 115 of FIG. 2. Based on a mapping 675 between the network policy 180 applicable to the data flow 165 and ClassIDs, the ClassID 170 may be determined and encapsulated into the data flow 165 to form the classified data flow 175 prior to transmission from the Kubernetes cluster 610 toward a targeted source application.

C. Service Mesh Classifier

Figure 7:
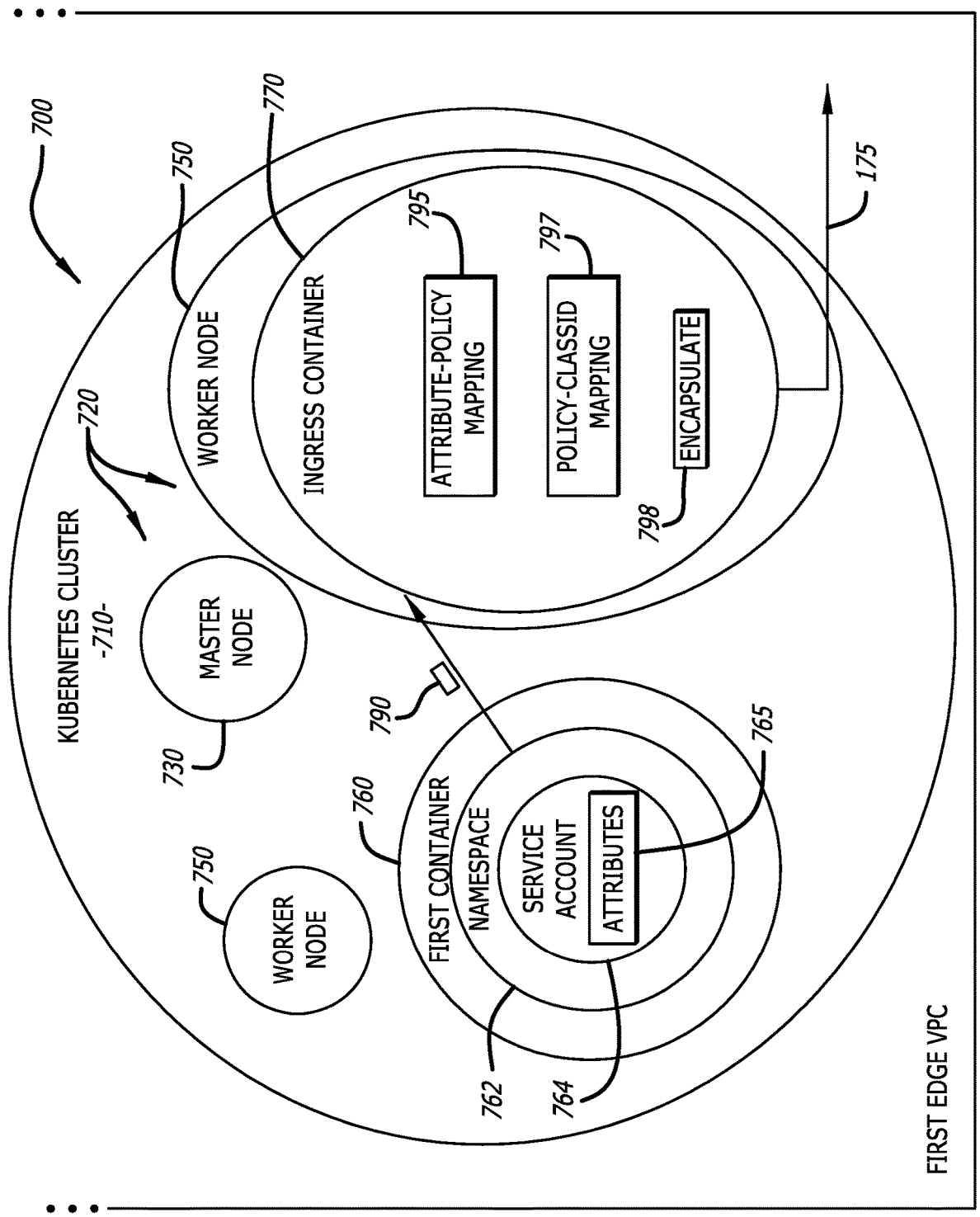
FIG. 7 is a third exemplary embodiment of a cloud network infrastructure including a third type of classifier that performs policy-based data flow classification.

Referring to FIG. 7, a third exemplary embodiment of a cloud network infrastructure 700 including a third type of classifier that performs policy-based data flow classification is shown. Herein, a Kubernetes cluster 710 may be deployed as part of the first edge VPC 120. As in FIG. 6, the Kubernetes cluster 710 features a plurality of nodes 720, including a master node 730 and one or more worker nodes 750. The master node 730 controls the state of the Kubernetes cluster 710 while the worker node(s) 750 are the components that perform tasks (e.g., running applications, etc.) assigned by the master node 730. Differing from the Kubernetes classification scheme of FIG. 6, this classifier obtains the attributes from a digital (TLS) certificate exchanged between two containers within the same or different worker nodes 750.

More specifically, as shown, a first container 760 establishes a secure communication link 780 (e.g., Transport Layer Security "TLS" link) that terminates at a second container 770 operating as the ingress gateway 200₁ of FIG. 2, hereinafter "ingress container" 770. The first container 760 may operate as a cloud instance running the source application, including a namespace 762 being a virtual cluster that overlays a physical cluster and includes attributes 765 associated with the source application and/or a service account 764 being a data store to maintain attributes 765 for the source application running in the first container 760. The attributes 765 may be included in and obtained from a TLS certificate 790 exchanged between the first container 760 and the ingress container 770.

Referring still to FIG. 7, upon accessing the attributes 765 along with attributes included as part of the data flow 165, the ingress container 770 is configured to determine the network policy 180 (or group of network policies) comporting with the data flow 165 (e.g., via a decision-tree analysis or other type of deterministic scheme) based on an attribute-policy mapping 795 provided from the controller 115 of FIG. 2. Based on another mapping 797 between the network policy 180 applicable to the data flow 165 and ClassID 170, the ClassID 170 may be determined and encapsulated by encapsulate logic 798 into the data flow 165 to form the classified data flow 175 prior to transmission from the Kubernetes cluster 710 toward a targeted destination application.

IV. Message Configuration for Data Flows

Referring now to FIGS. 8A-8E, exemplary embodiments of the logical structure of messages associated with classified data flows transmitted from the ingress gateways of FIGS. 2, 6-7 are shown. With respect to FIG. 8A, supporting a first communication protocol (ESP), an incoming message (e.g., IP packet) 800 associated with the data flow 175 is received and are encapsulated for transmission over communication links (e.g., tunnels). The encapsulated message 805 includes a tunneling header 810, which may include an optional User Datagram Protocol (UDP) header 812, an Encapsulating Security Protocol (ESP) header 814 and the determined ClassID 170. Herein, the ClassID 170 is part of the encapsulated message to prevent tampering during transmission by an interloper or any malicious application or entity. The encapsulated message 805 is included as part of an IP message, thereby having an IP header 820, for transmission from the ingress gateway over an IP-based communication link.

Figure 8A:
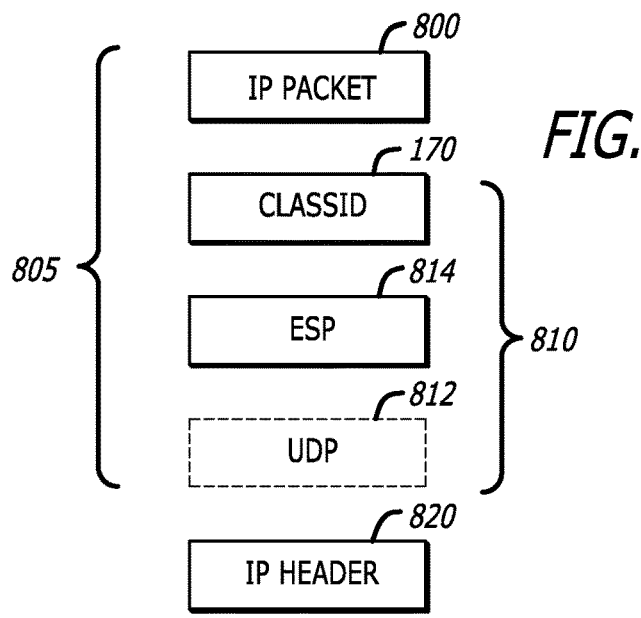
FIGS. 8A-8E are exemplary embodiments of the logical structure of messages associated with classified data flows transmitted from the ingress gateways of FIGS. 2, 6-7.
Figure 8B:
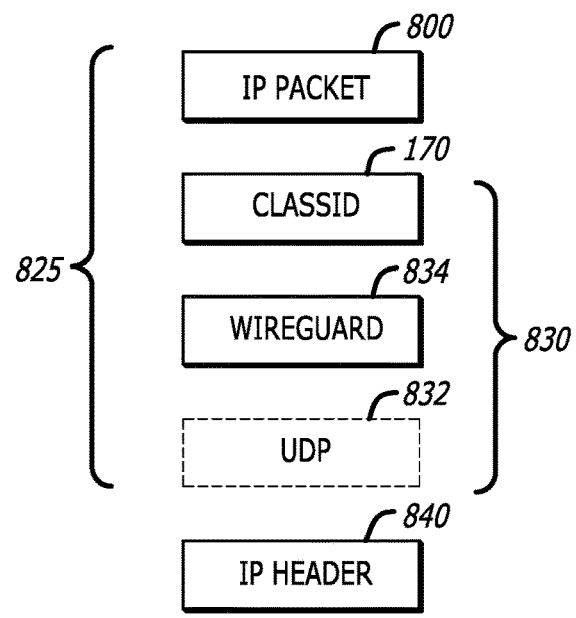

With respect to FIG. 8B, supporting a second communication protocol (WireGuard), the incoming message (e.g., IP packet) 800 associated with the data flow 175 is received and are encapsulated for transmission over communication links (e.g., tunnels). The encapsulated message 825 includes a tunneling header 830, which may include an optional User Datagram Protocol (UDP) header 832, a WireGuard header 834 and the determined ClassID 170. The encapsulated message 825 is included as part of an IP message, thereby having an IP header 840, for transmission from the ingress gateway over an IP-based communication link.

Figure 8C:
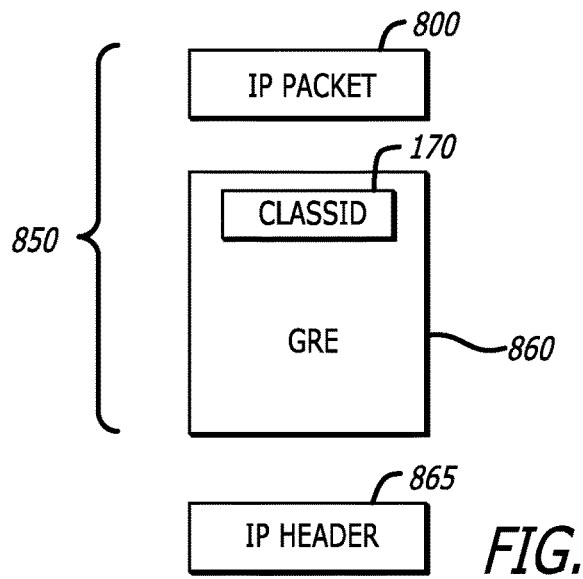

With respect to FIG. 8C, supporting a third communication protocol (Generic Routing Encapsulation), the incoming message (e.g., IP packet) 800 associated with the data flow 175 is received and are encapsulated for transmission over communication links (e.g., tunnels). The encapsulated message 850 includes a Generic Routing Encapsulation (GRE) header 860, which may include available fields to include the determined ClassID 170. The encapsulated message 850 is included as part of an IP message, thereby having an IP header 865, for transmission from the ingress gateway over an IP-based communication link.

Figure 8D:
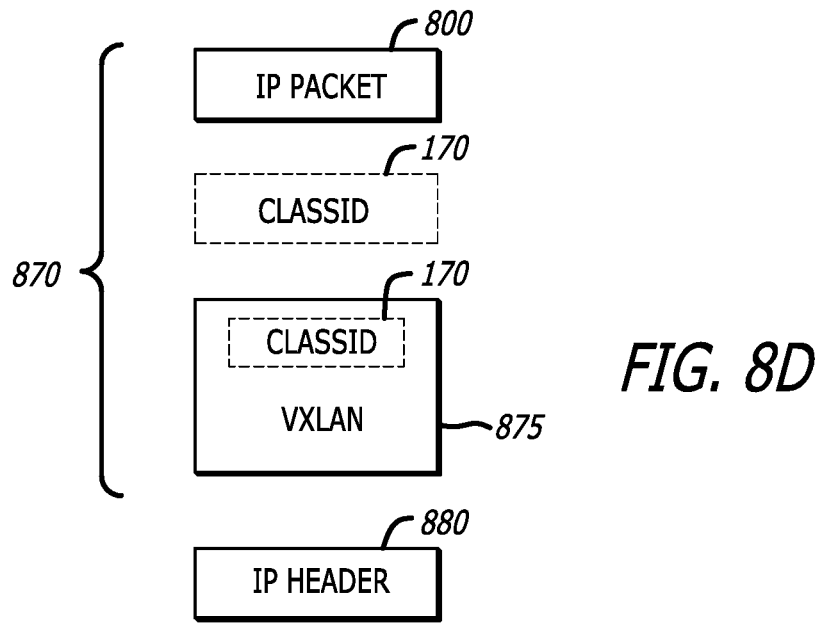

With respect to FIG. 8D, supporting a fourth communication (encapsulation) protocol such as Virtual Extensible LAN (VXLAN), the incoming message (e.g., IP packet) 800 associated with the data flow 175 is received and are encapsulated for transmission over communication links (e.g., tunnels). The encapsulated message 870 includes a VXLAN header 875, which may include the determined ClassID 170 and the ClassID 170 may be included as part of the encapsulated message 870. The encapsulated message 870 is included as part of an IP message with an IP header 875 for routing a transmission from the ingress gateway over an IP-based communication link.

With respect to FIG. 8D, supporting a fourth communication (encapsulation) protocol such as Virtual Extensible LAN (VXLAN), the incoming message (e.g., IP packet) 800 associated with the data flow 175 is received and are encapsulated for transmission over communication links (e.g., tunnels). The encapsulated message 870 includes a VXLAN header 875, which may include the determined ClassID 170 (e.g., placed in a 24-bit VNI field) and the ClassID 170 may be included as part of the encapsulated message 870. The encapsulated message 870 is included as part of an IP message with an IP header 880 for routing a transmission from the ingress gateway over an IP-based communication link.

Figure 8E:
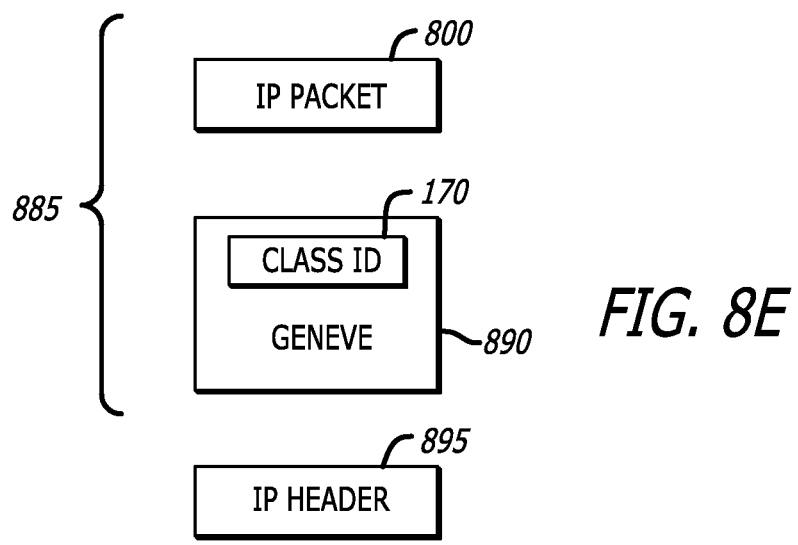

With respect to FIG. 8E, supporting a fifth communication (encapsulation) protocol such as Geneve, the incoming message (e.g., IP packet) 800 associated with the data flow 175 is received and are encapsulated for transmission over communication links (e.g., tunnels). The encapsulated message 885 includes a Geneve header 890, which may include the determined ClassID 170. The encapsulated message 885 is included as part of an IP message with an IP header 895 for routing a transmission from the ingress gateway over an IP-based communication link.

Embodiments of the invention may be embodied in other specific forms without departing from the spirit of the present disclosure. The described embodiments are to be considered in all respects only as illustrative, not restrictive.

What is claimed is:

1. A non-transitory storage medium comprising:
   data analytic logic configured to determine which of at least one network policy of a plurality of network policies is applicable to an incoming data flow and assigning a classification identifier in accordance with the at least one network policy, wherein the classification identifier is configured to influence routing paths through at least one cloud network; and
   message reconfiguration logic configured to encapsulate the classification identifier into content of the incoming data flow to generate a classified data flow for routing from a source to a destination through the at least one cloud network,
   wherein the data analytic logic determines which of at least one network policy of a plurality of network policies is applicable to the incoming data flow by at least (i) accessing static attributes from a gateway properties data store and dynamic attributes from the content of the incoming data flow to determine at least a first network policy applicable to the incoming data flow and (ii) accessing a data store directed to a network policy-to classification identifier mapping to determine the classification identifier associated with the data flow.

2. The non-transitory storage medium of claim 1 further comprising:
   one or more queues; and
   queue monitoring and selection logic configured to detect storage of content associated with the incoming data flow within the one or more queues and signal the data analytic logic.

3. The non-transitory storage medium of claim 2, wherein the one or more queues includes at least a first queue and a second queue configured in accordance with a classification priority in which a prescribed range of classification identifiers associated with classified data flows are placed into a first queue assigned a higher classification in transmission of classified data flows from the network device.

4. The non-transitory storage medium of claim 1, wherein the message reconfiguration logic further comprises route prediction logic configured to select a particular transit gateway and communication link to receive the classified data flow.

5. The non-transitory storage medium of claim 1 further comprising a control logic configured to execute the data analytic logic and the message reconfiguration logic stored within a non-transitory storage medium.

6. The non-transitory storage medium of claim 1 being communicatively coupled to the source corresponding to a first cloud instance and a destination corresponding to a second cloud instance.

7. The non-transitory storage medium of claim 6, wherein the first cloud instance is deployed within a first public cloud network and the second cloud instance is deployed within a second public cloud network different from the first public cloud network.

8. The non-transitory storage medium of claim 1, wherein the data analytic logic determines which of at least one network policy of a plurality of network policies is applicable to the incoming data flow by at least accessing attributes associated with content of the incoming data flow to determine at least a first network policy applicable to the incoming data flow.

9. The non-transitory storage medium of claim 8, wherein the accessing of the attributes associated with the content of the incoming data flow comprises obtaining static attributes associated with the incoming data flow based on properties associated with the network device receiving the incoming data flow.

10. The non-transitory storage medium of claim 9, wherein the static attributes associated with the incoming data flow include a location of the network device operating as an ingress gateway that corresponds to a location of a cloud instance operating as a source of the incoming data flow.

11. The non-transitory storage medium of claim 8, wherein the accessing of the attributes associated with the incoming data flow comprises obtaining dynamic attributes associated with the incoming data flow obtained based on a mapping between (i) a network address associated with a source of the incoming data flow and (ii) attributes associated with the source.

12. The non-transitory storage medium of claim 1, wherein the determining of which of at least one network policy of the plurality of network policies is applicable to the incoming data flow includes identifying one or more network policies correlated to attributes associated with the incoming data flow.

13. A network device, comprising:
    control logic;
    a non-transitory storage medium communicatively coupled to the control logic, the non-transitory storage medium comprising:
      one or more queues,
      data analytic logic configured to determine which of at least one network policy of a plurality of network policies is applicable to an incoming data flow and assigning a classification identifier in accordance with the at least one network policy, wherein the classification identifier is configured to influence routing paths through at least one cloud network, and
      message reconfiguration logic configured to encapsulate the classification identifier into content of the incoming data flow to generate a classified data flow for routing from a source to a destination through the at least one cloud network,
    wherein the data analytic logic determines which of at least one network policy of a plurality of network policies is applicable to the incoming data flow by at least (i) accessing static attributes from a gateway properties data store and dynamic attributes from the content of the incoming data flow to determine at least a first network policy applicable to the incoming data flow and (ii) accessing a data store directed to a network policy-to classification identifier mapping to determine the classification identifier associated with the data flow.

14. The of claim 13 further comprising:
    queue monitoring and selection logic configured to detect storage of content associated with the incoming data flow within the one or more queues and signal the data analytic logic.

15. The of claim 14, wherein the message reconfiguration logic further comprises route prediction logic configured to select a transit gateway and communication link to receive the classified data flow and continuing routing of the classified data flow to the destination.

16. The of claim 13 being communicatively coupled to the source corresponding to a first cloud instance and a destination corresponding to a second cloud instance.

17. The of claim 16, wherein the first cloud instance is deployed within a first public cloud network and the second cloud instance is deployed within a second public cloud network different from the first public cloud network.

18. The of claim 13, wherein the data analytic logic determines which of at least one network policy of a plurality of network policies is applicable to the incoming data flow by at least accessing attributes associated with content of the incoming data flow to determine at least a first network policy applicable to the incoming data flow.

19. The of claim 18, wherein the accessing of the attributes associated with the content of the incoming data flow comprises obtaining static attributes associated with the incoming data flow based on properties associated with the network device receiving the incoming data flow.

20. The of claim 19, wherein the static attributes associated with the incoming data flow include a location of the network device operating as an ingress gateway that corresponds to a location of a cloud instance operating as a source of the incoming data flow.

21. The of claim 18, wherein the accessing of the attributes associated with the incoming data flow comprises obtaining dynamic attributes associated with the incoming data flow obtained based on a mapping between (i) a network address associated with a source of the incoming data flow and (ii) attributes associated with the source.

22. The of claim 13, wherein the determining of which of at least one network policy of the plurality of network policies is applicable to the incoming data flow includes identifying one or more network policies correlated to attributes associated with the incoming data flow.

* * * * *